No. 771,721. PATENTED OCT. 4, 1904.
J. M. DODGE.
DRIVE CHAIN.
APPLICATION FILED MAY 18, 1904.
NO MODEL. 2 SHEETS—SHEET 2.

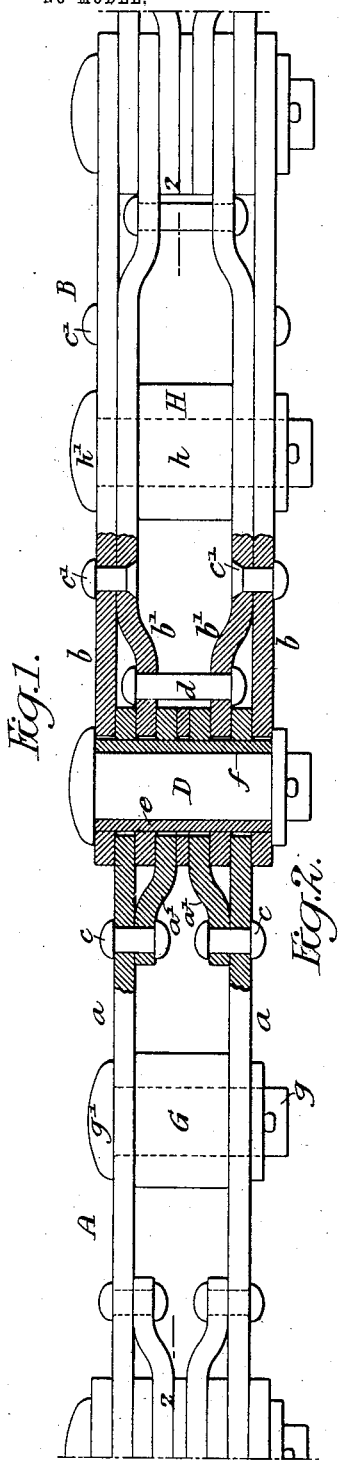

Witnesses:
Wesley H. Reel.
Louis H. Buck.

Inventor:
James M. Dodge,
by his Attorneys,
Howson & Howson

No. 771,721.

Patented October 4, 1904.

UNITED STATES PATENT OFFICE.

JAMES M. DODGE, OF PHILADELPHIA, PENNSYLVANIA, ASSIGNOR TO THE LINK BELT ENGINEERING COMPANY, OF PHILADELPHIA, PENNSYLVANIA, A CORPORATION OF PENNSYLVANIA.

DRIVE-CHAIN.

SPECIFICATION forming part of Letters Patent No. 771,721, dated October 4, 1904.

Application filed May 18, 1904. Serial No. 208,608. (No model.)

*To all whom it may concern:*

Be it known that I, JAMES M. DODGE, a citizen of the United States, residing in Philadelphia, Pennsylvania, have invented certain Improvements in Drive-Chains, of which the following is a specification.

My invention relates to certain improvements in drive-chains of the type in which the links are made up of a series of flat elements arranged side by side.

The object of my invention is to provide driving-rollers for such chains with which the teeth of the sprocket-wheels engage.

Figure 3:
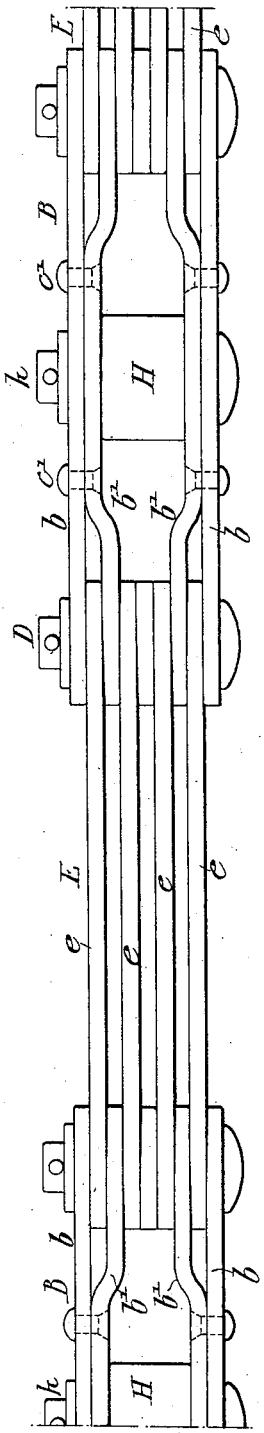
Figure 4:
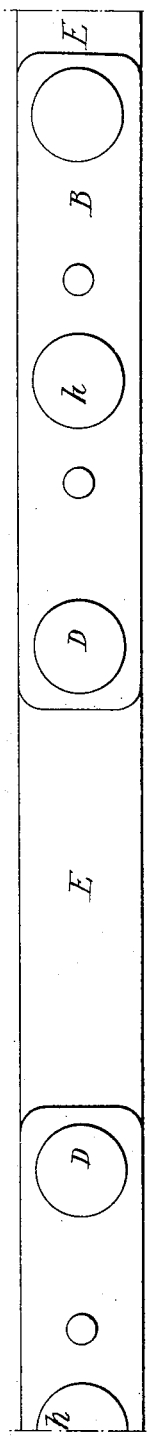

Referring to the accompanying drawings, Figure 1 is a plan view, partly in section, illustrating a chain in which each link is provided with a driving-roller. Fig. 2 is a sectional view on the line 2 2, Fig. 1. Fig. 3 is a plan view showing a chain in which the alternate links are provided with driving-rollers. Fig. 4 is a side view of the chain shown in Fig. 3. Fig. 5 is a view of a modification of my invention, and Fig. 6 is a side view of Fig. 5.

A is a link having two side elements $a\ a$ and two intermediate elements $a'\ a'$ at each end. The intermediate elements are short and are secured to the side elements by rivets $c\ c$. Alternating with the elements of the link A are the elements $b\ b'$ of the link B, $b\ b$ being the side elements and $b'\ b'$ being the intermediate elements. The intermediate elements, however, in this link extend from one end of the link to the other and are secured to the side elements by rivets $c'$.

D is a pivot-pin, and carried by the elements of the link A is a segmental bushing $f$, and carried by the elements of the link B is a segmental bushing $e$. When the link A is turned on its pivot, the bushing $f$ will turn with it, and when the link B turns its bushing $e$ will turn with it, there being sufficient clearance in the opposite links to allow of the free movement of the links upon the pivot. This construction of the bushings and pivot-pin is fully set forth and claimed in a patent granted to me on the 24th day of May, 1904, No. 761,034.

G is a driving-roller mounted between the side elements $a\ a$ of the link A and on a pin $g$, which extends from one side element to the other. The pin in the present instance has a head $g'$ at one end and is held by a washer and a cotter-pin at the opposite end.

H is a driving-roller carried by the link B and mounted on a pin $h$, having a head $h'$ and held in place by a cotter-pin. The construction above described enables me to place a roller between the side elements of the links and between the pivot-points of the links.

I prefer to couple the two intermediate elements $b'$ of the link B by a rivet $d$, so as to hold the elements in line when strain is placed upon the chain.

In Figs. 3 and 4 I have shown a chain in which the alternate links only are provided with driving-rollers. I have shown in this instance the links B alternating with links E, consisting of a series of plain elements $e$.

In Fig. 5 I have shown a method of attaching the short elements of a link to the side elements differing from that shown in Fig. 1. $a^2\ a^2$ are the side elements of the link A', and $a^3\ a^3$ are the intermediate elements. These several elements are slotted, as shown, and they are secured together by double wedges C C, each wedge having a head $c^2$ and beveled at the opposite side, so that the end $c^3$ can be turned down upon the beveled surface and locked to prevent the wedges separating. The intermediate elements $b^3$ of the link B' are held to the side elements by wedges C' similar to the wedges C of the link A. Carried by the link B' is a roller H', and carried by the link A' is a roller G'. Both rollers may be plain; but the roller G' in the present instance is reduced at $g^2$, and a ring $g^3$ is placed on the reduced portion, so as to form a flange. The flange of the roller acts as a guide to prevent lateral movement of the chain in one direction. The rollers G and H of the chain shown in Fig. 1 may also be provided with flanges for the same purpose, if desired.

I claim as my invention—

1. The combination of a chain-link made of side elements and intermediate elements arranged side by side, and a roller mounted on the link between the ends thereof, substantially as described.

2. A chain-link made up of side elements and intermediate elements arranged side by side at the pivot-point and having an open center, with a roller mounted in the open center of the link, substantially as described.

3. The combination of a link made up of side elements and intermediate elements arranged side by side at each end and having an open center, a pin extending from one side member to the other, and a roller mounted on said pin between the side members, substantially as described.

4. The combination of a chain-link made up of side elements and intermediate elements arranged side by side, the intermediate elements being secured to the side elements and forming an open space between the pivot-points of the link, and a roller mounted in the open space of the link, substantially as described.

5. The combination of a link made up of side elements and intermediate elements, the intermediate elements being bent and secured to the side elements forming a central opening between the pivots, and a roller mounted in the open space, substantially as described.

6. The combination of a chain-link having side elements and intermediate elements, the intermediate elements being bent and secured to the side elements, and a rivet securing the intermediate elements together, with a roller mounted in the open space formed by bending the intermediate elements, substantially as described.

7. The combination in a chain made up of two sets of links, each set made up of two side elements and intermediate elements, pivot-pins coupling the said links, the intermediate elements of one set of links extending the full length of the link bent and secured to the side members and a roller mounted in the open space of the said link, the other links having short intermediate sections bent and secured to the side elements by riveting and rollers mounted in the spaces of said links, substantially as described.

In testimony whereof I have signed my name to this specification in the presence of two subscribing witnesses.

JAMES M. DODGE.

Witnesses:
    WILL. A. BARR,
    JOS. H. KLEIN.